United States Patent [19]

Barboni et al.

[11] 3,796,828

[45] Mar. 12, 1974

[54] TELECINE SYSTEM CONTROL ELECTRONICS TO PROVIDE SYNCHRONISM BETWEEN THE PROJECTOR PULLDOWN AND TELEVISION SCAN OVER A WIDE RANGE OF PULLDOWN RATES

[75] Inventors: Philip G. Barboni, Vestal; John A. Cooksey, Binghamton, both of N.Y.

[73] Assignee: The Singer Company, Binghampton, N.Y.

[22] Filed: Aug. 3, 1972

[21] Appl. No.: 277,754

Related U.S. Application Data

[63] Continuation of Ser. No. 133,208, April 12, 1971, abandoned.

[52] U.S. Cl. .......................... 178/7.2, 178/DIG. 28

[51] Int. Cl. ....................... H04n 5/86, G11b 15/54

[58] Field of Search ........ 178/DIG. 28, 7.2, 5.4 CD, 178/6.7 A, 7.6; 352/166, 167, 176; 35/12 N, 12 P

[56] References Cited

UNITED STATES PATENTS 2,496,102 1/1950 McCord ..................... 178/DIG. 28

FOREIGN PATENTS OR APPLICATIONS 859,030 1/1961 Great Britain .................. 178/6.7 A 1,037,060 7/1966 Great Britain ..................... 35/12 N

*Primary Examiner*—Howard W. Britton

*Assistant Examiner*—Michael A. Masinick

*Attorney, Agent, or Firm*—John C. Altmiller; James C. Kesterson

[57] ABSTRACT

A telecine system for use in a simulator visual system which synchronizes the application of light to the motion picture image, and the pulldown with the vertical sync of the television camera. The system is adapted to operate in a synchronized manner at variable speeds from zero up to the television field rate avoiding problems of uneven images shutter bars, etc.

14 Claims, 6 Drawing Figures

Philip G. Barboni and John A. Cooksey
INVENTORS

BY Charles S. McGuire
ATTORNEY

Philip G. Barboni
and
John A. Cooksey
INVENTORS

BY
Charles S. McGuire
ATTORNEY

Philip G. Barboni
and
John A. Cooksey
INVENTORS

BY Charles S. McGuire
ATTORNEY

INVENTORS:
Philip G. Barboni
& John A. Cooksey
BY Charles S. McGuire
ATTORNEY

TELECINE SYSTEM CONTROL ELECTRONICS TO PROVIDE SYNCHRONISM BETWEEN THE PROJECTOR PULLDOWN AND TELEVISION SCAN OVER A WIDE RANGE OF PULLDOWN RATES

RELATED APPLICATIONS

This application is a continuation of application Ser. No. 133,208 filed on Apr. 12, 1971, now abandoned.

BACKGROUND OF THE INVENTION

This invention relates to visual systems in general and more particularly to an image generation system which is useful in simulators.

In various types of systems it is desirable to display a motion picture on a television screen. Such telecine systems have been developed in particular for use in television broadcasting. In these systems, projectors are run at a single speed and the problem of synchronizing the projector with the television scan is not particularly difficult. A good description of such systems is found in an article entitled A Review of Telecine Systems by D. Morse in Volume 73 (July 1964) of the Journal of the SMPTE, pages 548, et seq.

However, when the same sort of system is used in an application where variable projector speeds are required, problems may arise. For example, in simulators, such as aircraft, locomotive or driver trainers it is necessary to have a wide range of film projection speed, ideally from zero to about twice the taking speed of the film. With a fixed TV scan rate and projection light pulses synchronized therewith (e.g., by conventional constant speed shutter drives) at some projection rates film pull down will occur during projection, with undesireable effects.

SUMMARY OF THE INVENTION

The present invention shows a system with a pulsed-pull down type movie projector in which the film pull down and application of the projector light source are synchronized to the vertical sync of the television camera in such a way that the projection rate may be varied as desired between wide limits without noticeable deterioration of picture quality.

It is the object of this invention to provide a system which will permit film pull down and projector lighting in a telecine system to be synchronized to the vertical scan of the television in a manner which will result in a picture free of jitter and bars.

Another object is to provide such a system which is operable with a variable speed projector.

A further object is to provide such a system which is useful in visual simulation.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

DESCRIPTION OF THE PREFERRED EMBODIMENT

Figure 1:
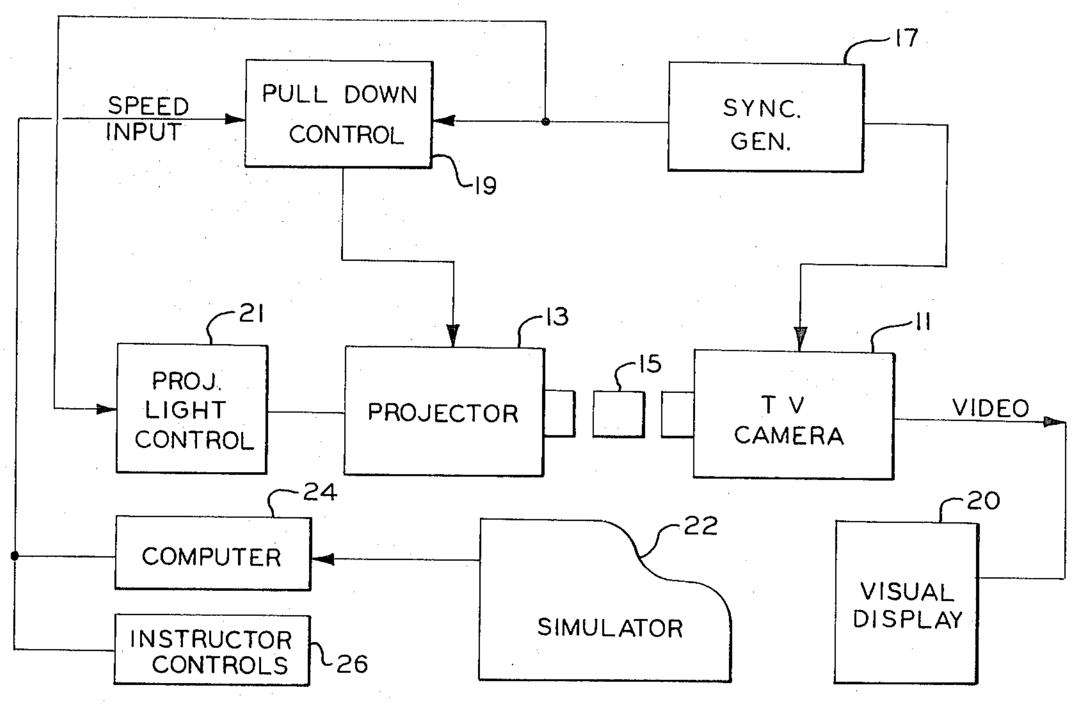
FIG. 1 is a block diagram of a preferred embodiment of the system.

FIG. 1 shows the basic elements of the system. Camera 11 is arranged to view the picture projected by projector 13 through standard optical elements 15. The camera 11 is a standard high resolution TV camera with a vidicon tube, or other such conventional storage type pick up tube. The projector 13 is a film projector with a high speed pulsed pull down. An example of such pull down mechanism is Wollensak Model 304 Com. A sync generator 17 provides horizontal and vertical sync pulses to TV camera 11. Vertical sync pulses are also provided to pull down electronics 19 and projection light control mechanism 21 of projector 13, both of which will be described in detail below. In the disclosed embodiment, as will be explained more fully in connection with FIG. 5, light mechanism 21 is set up to provide pulses of light substantially during the vertical blanking time of camera 11 (which occurs during vertical retrace). Pull down electronics are set to pull down only when the light is not on. In both cases, proper timing is assured by synchronization with the TV camera vertical scan. (It will be understood of course that the conventional projection lamp may be on at all times, and the terms "on" and "off" as used herein may denote the admission or blocking of such light by a shutter, or the like, with respect to the film.)

A normal sequence of operation would start with a pull down. After the film has been pulled down to position a frame for projection, the projection light would be transmitted through the film to project an image to the TV camera. Light transmission would be timed to begin approximately at the start of vertical blanking and to end after a period of time substantially equal to the vertical blanking time. The projected image would then be stored on the vidicon tube of camera 11 which is then scanned to produce a video signal. Any time before the next light pulse another pull down may occur (if required) to get ready to pulse the light and project the next frame. Thus, since pull down always occurs during the period the light is off, no flicker problems or shutter bars will result. By exposing the vidicon during vertical blanking (retrace) and then scanning, the whole vertical scan time is made available for pull down.

The video signal from camera 11 is provided to a suitable visual display device 20 arranged for viewing by a student in vehicle simulator 22, e.g., a conventional aircraft simulator. Outputs from the controls of simulator 22 are processed in computer 24 to provide, among others, an output commensurate with the desired projection rate, normally dependent upon the simulated speed of the simulator with respect to the scene depicted on the visual display. Instructor controls 26 may be provided, also in accordance with techniques well known in the simulation field, to supplement or override the speed input from computer 24.

It should be noted here, and the point is further explained in connection with the later discussion of FIG. 5, that while the "on" period of the projection lamp must be synchronized with the vertical scan of the camera, as a practical matter it may occur at any time during the scan cycle. That is, the vidicon tube must be exposed once for each scan or field (two fields comprising one complete raster frame, according to conventional practice), but the exposure may take place at any point during vertical scan or retrace so long as it occurs at the same point each time to insure uniformity of exposure of the vidicon. Although the present disclosure places this point during, or substantially during, vertical retrace or blanking, it may occur in any other fixed portion of the vertical scan cycle if for some reason this should be more convenient or desirable. Although this may result in a single raster having visual information from more than one film frame, this would rarely if ever be of consequence since the change in visual information from one frame to the next is too slight for visual detection in applications such as those considered herein.

Thus, the period during which the light is on may overlap either end of the vertical blanking period without any detrimental effect. It is only necessary that the light not be on during pulldown. This may be accomplished by delaying any output from the pull down electronics long enough to assure the light is off. With a reasonably fast pull down mechanism, this may be easily done since the time available during one complete vertical scan is well in excess of the time required for actual pull down in many conventional projectors.

Figure 2:
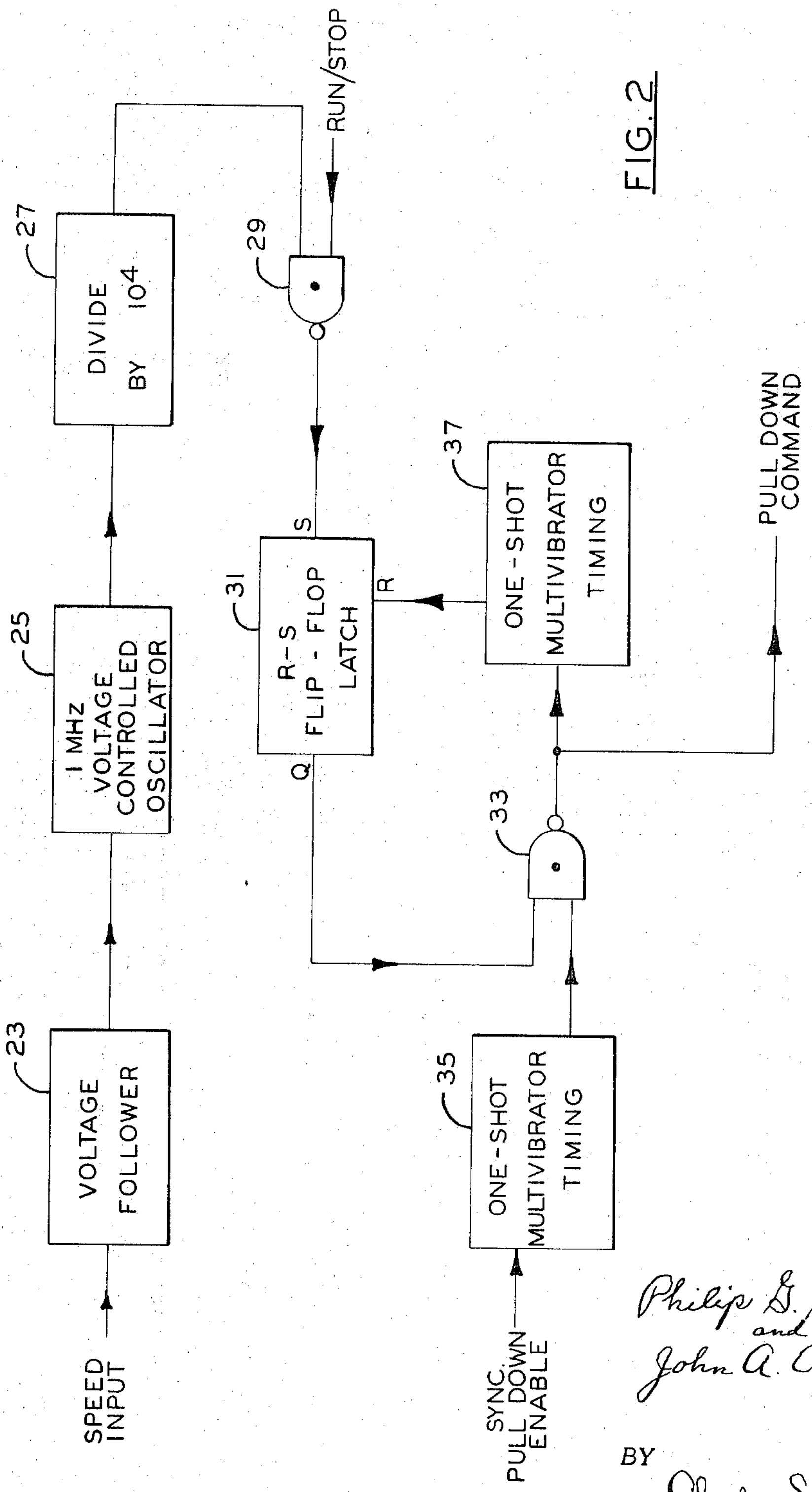
FIG. 2 is a block diagram of the pull down electronics of FIG. 1.

FIG. 2 shows a block diagram of the pull down electronics of the invention which insure that a pull down will not occur while the light is on regardless of the pull down rate. An analog signal which is proportional to desired film projection speed is provided to block 23, a voltage follower which provides isolation and presents to voltage controlled oscillator (VCO) 25 a high output impedance. VCO 25 is of the type well known in the art in which the oscillator output frequency is proportional to the voltage input. For example, if the maximum input voltage is 10 volts, with a 1 MHz oscillator, one volt will give an output of 100 KHz. The output of VCO 25 is divided by $10^4$ in block 27 by counting down the pulses in digital counters, a method of pulse division well known in the art. Thus, at the output of block 27, 1 volt input to VCO 25 is equivalent to 10 Hz. This output is one input to Nand gate 29. The second input is a Run/Stop input by which the gate will be enabled when it is desired to run the projector and disabled when the projector is to be stopped. With gate 29 enabled the pulses from block 27 will be gated through to set-reset (R-S) flip flop 31. Each pulse will set flip flop 31. The set output of the flip flop 31 is one input to gate 33 and will enable that gate. The other input to gate 33 is from one-shot multivibrator 35 which has as its input the vertical sync command and will provide an output pulse which is slightly delayed from the end of vertical blanking to assure that the light is off.

With gate 33 enabled the pulse from one-shot 35 will pass through the gate and will be provided to the pull down mechanism of the projector. The output of gate 33 will also trigger one-shot 37 which will, after a short time delay, for example 40 $\mu$s, to allow the pulse from one-shot 35 to pass through gate 33, reset flip flop 31. Flip flop 31 is then ready to accept the next pulse from gate 29.

Figure 3:
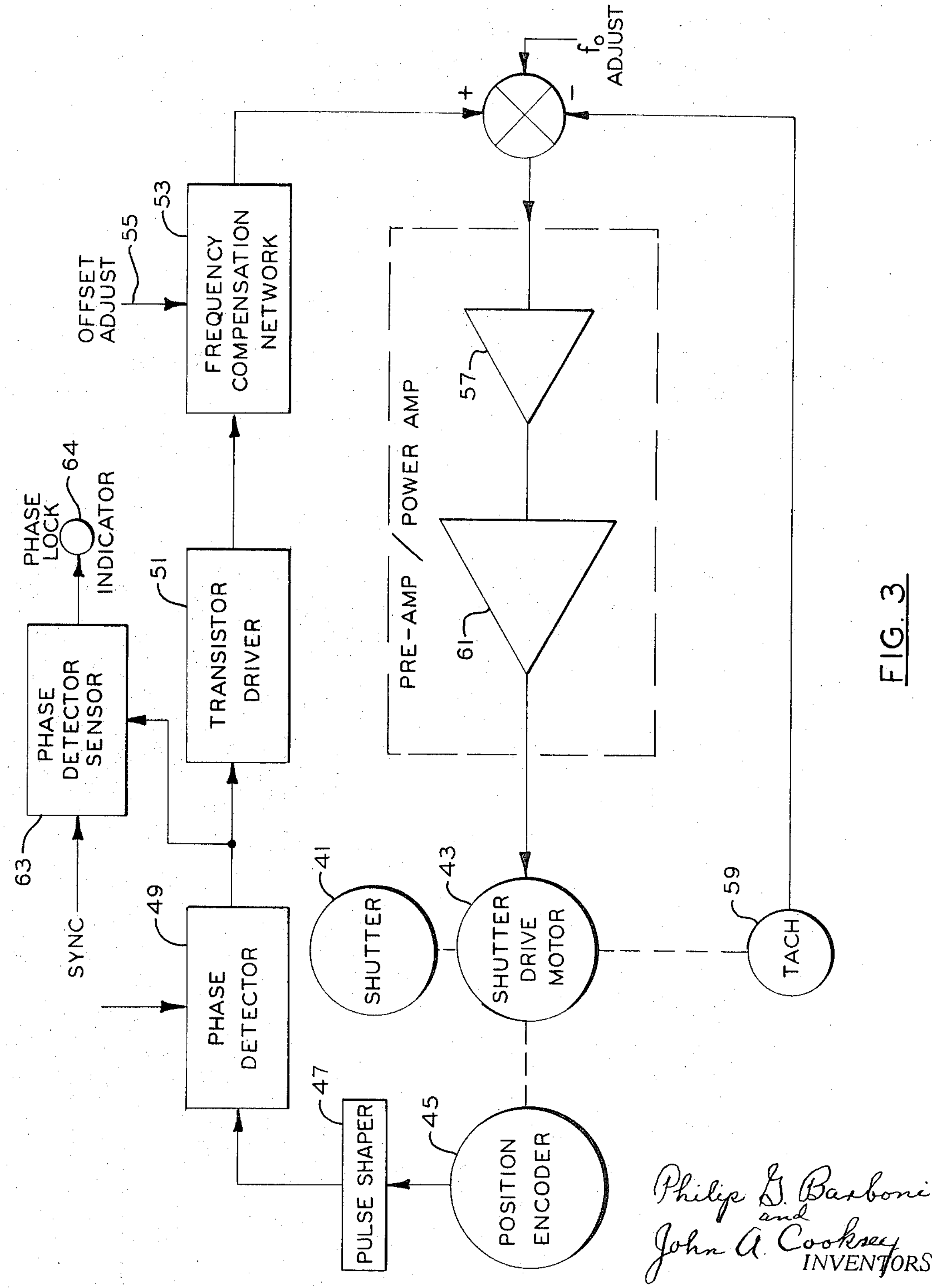
FIG. 3 is a block diagram of the pulsed light system of FIG. 1.

The pulsing of the light source of the projector may be done by pulsing the light itself, with an iris mechanism or with a rotating shutter. FIG. 3 shows a block diagram of an embodiment using the last mentioned method. The normal vertical rate used in U.S. television is 60 Hz and will be used for this example. The system will work equally well with the European standard of 50 Hz or other frequencies; of course, the maximum pull down frequency may not exceed the vertical frequency with which the pull down and light are synchronized.

On FIG. 3 shutter 41 is shown driven by motor 43. The shutter 41 is a disk having two openings (not shown) of 16.2° separated by 180°. By rotating the shutter at one half the vertical rate, e.g., 30 Hz, 60 flashes of light each of 1.5 ms duration will occur. This duration is approximately equivalent to the vertical retrace time, during which the light is synchronized to project an image.

Connected to the motor shaft is a second disk, part of position encoder 45. The disk has two slits 180° apart. Located on one side of the disk is a fixed light source and on the other side, in line with the light source, a photodiode. As the slits pass the light and diode, pulses are generated. The frequency of the pulses will be twice the rate of rotation. (i. e., 60Hz when the motor is operating at the desired speed of 30 rpm)

The pulses are input to block 47 where they are amplified and passed through a Schmidt trigger circuit for shaping. This output pulse is an input to phase detector 49 which has as its second input the vertical sync. Each of these inputs is passed through a respective one-shot to obtain pulses of a desired shape and duration. The output of the vertical sync one-shot is a reset command to a flip flop and the output of the encoder one shot the set command to the same flip flop. The output of this flip flop (the output of detector 49) will therefore be a 60Hz pulse whose width is determined by the phase relationship between the sync signal and the encoder pulse.

The output from phase detector 49 is an input to transistor driver 51 which is used to increase loop gain by a factor of four. (The transistor switches 12 volts and, since the input is only 3 volts, a gain of four results.) The output of driver 51 is an input to frequency compensation network 53. This network comprises a series of three operational amplifier filters necessary to stabilize the closed loop gain.

Figure 6:
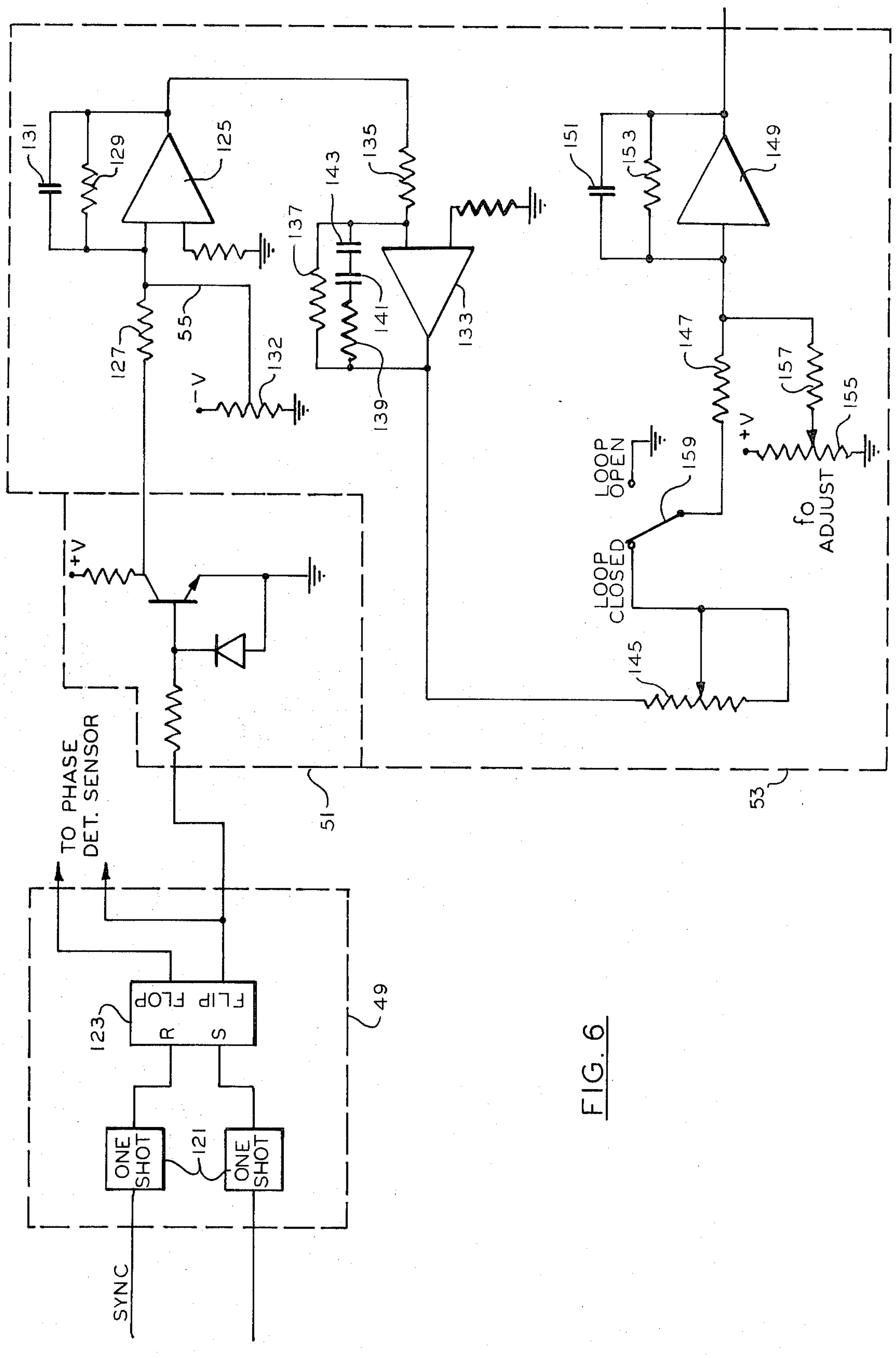
FIG. 6 is a circuit diagram of the phase detector, transistor driver and frequency compensation network of FIG. 3.

These portions of the circuits are shown in more detail in FIG. 6. As shown thereon the sync pulse is passed through a one-shot 121 to reset a flip flop 123. The set command of flip flop 123 is provided through the other one shot 121 which will obtain its input from the position encoder. The output of flip-flop 123 is provided through transistor driver 51 comprising a transistor and its associated circuitry to the input resistor 127 of an amplifier 125.

A second input to amplifier 125 is an offset adjust on line 55 from a potentiometer. Amplifier 125 has in its feedback path a resistor 129 in parallel with a capacitor 131. The output of amplifier 125 is provided through input resistor 135 to amplifier 133. This amplifier has a resistor 137 in parallel with the series combination of resistor 139 and capacitors 141 and 143 in its feedback path. The output of amplifier 133 is then provided through a gain control potentiometer 145 and switch 159, which allows open or closed loop operation of the system, to the input resistor 147 of amplifier 159. Amplifier 149 has in its feedback path a resistor 153 in parallel with a capacitor 151. An additional input is shown to amplifier 149, through a resistor 157, from a $f_o$ adjust potentiometer 155.

The output of network 53 is supplied to the summing junction of preamplifier 57 where it is summed with a tachometer feedback signal from tachometer 59 and a frequency adjust input. (The $f_o$ or frequency adjust input may be located here or as shown on FIG. 6). The output of preamplifier 57 is provided to a power amplifier 61 which drives motor 43. The function of tachometer 59, coupled in the system as described and shown, is to stabilize the control loop and establish the desired projector speed within limits to enable fine control by the frequency responsive network which operates as described below.

In operation, driver 51 will output a square wave of 12v amplitude. The system is set up so that the encoder signal and the sync signal are 180° apart when properly operating and phase locked. In the phase locked condition, the pulse from driver 51 will be on half the time and off half the time.

The 12 volt pulse will be offset by the negative offset voltage on line 55 to provide a positive and negative swing about zero. When this is passed through amplifier 125 and its associated circuitry averaging results. Considering the 12 volt pulse and the offset voltage separately it can be seen that when the 12 volt pulse is averaged in network 53 a 6 volt DC level will result. By placing an input of 6 volts with opposite polarity on line 55, the resulting output of network 53 will be zero during phase lock. As the system gets out of phase lock, the "on" period of the pulse from drive 51 will be shorter or longer resulting in an average of more or less than 6 volts. When summed with the input of line 55 this will result in a positive or negative output from network 53 to tend to bring the drive back into synchronization.

The remaining two amplifiers 133 and 149 and their associated circuitry are used for frequency compensation to stabilize the servo system. The required networks can be found using standard servo analysis techniques taking into consideration loop gain, motor characteristics load, etc. For example see *Direct Drive Servo Design Handbook*, Inland Motor Corporation, 1967. The $f_o$ input supplies a voltage which will drive the shutter motor 43 at a nominal speed. In this way the output from circuit 53 need only adjust for variance from the nominal speed.

Figure 4:
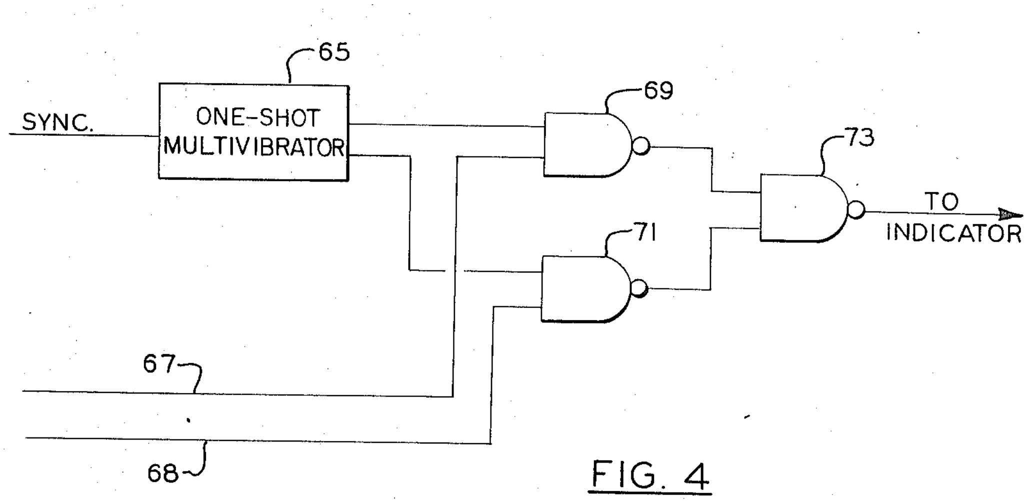
FIG. 4 is a logic diagram of the phase detector sensor of FIG. 3.

To give a visual indication of phase lock, phase detector sensor 63 and indicator 64 are provided. The sensor 63 detects the phase lock condition and provides an output to indicator 64. The circuits of sensor 63 are shown on FIG. 4. As previously indicated, phase detector 49 provides an output pulse having a width which is determined by the phase relatiohsip between the sync signal and encoder pulse. During phase lock this signal will be on half the time. This signal will be provided on line 67 of FIG. 4.

The circuits of detector 49 also can provide the inverse of this pulse which will be supplied to line 68. The 60Hz sync signal is provided to a one-shot 65 which is set to provide a pulse of equal width to that on line 67 during phase lock. This output and that of line 67 are inputs to And gate 69 which will have an output only when both inputs are present. One-shot 65 also has an inverted output which is Anded with the signal on line 68 in gate 71. The outputs of gates 69 and 71 are Ored in gate 73 which provides the signal to indicator 64 of FIG. 3.

Thus, during phase lock, gate 69 will have an output one half of the time and gate 71 the other half, and indicator 64 will light brightly. When out of phase lock, the gate outputs will not be continually present due to the lack of coincidence at the inputs and the indicator will dim or blink.

Figure 5:
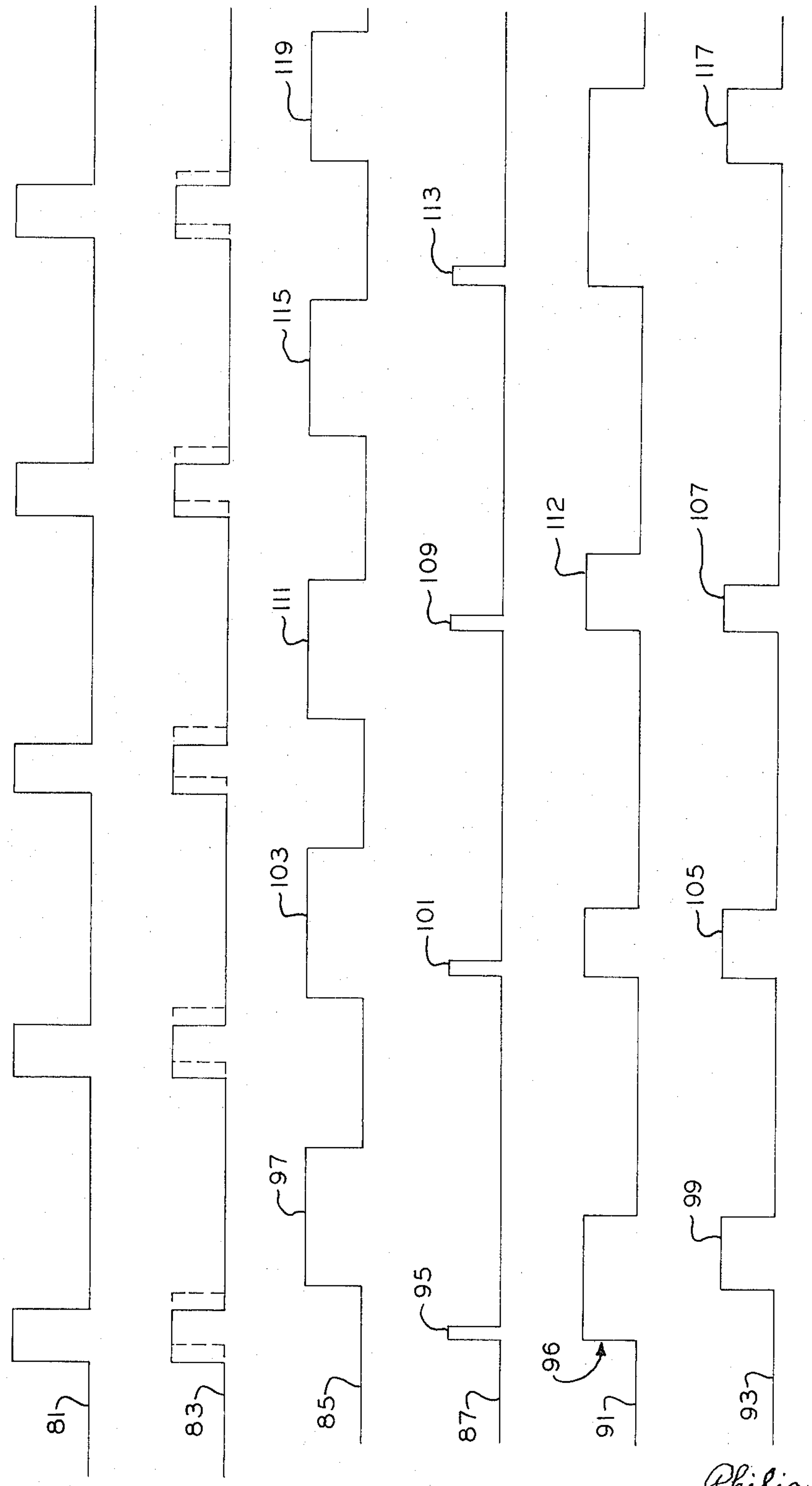
FIG. 5 is a timing diagram.

The timing of the overall operation is illustrated in FIG. 5. Pulse train 81 represents the vertical blanking time and train 83 the "on" period of the light. As indicated by the dotted lines, it may occur partially or fully within the period of vertical blanking. The output of one-shot 35 of FIG. 2 is shown by pulse train 85. It is delayed to come on a predetermined period of time after the end of light pulsing, the delay assuring that the light will be off. The output of gate 29 of FIG. 2 (indicating a pull down is desired) is shown by pulse train 87. It in turn will set flip flop 31 whose output is indicated by pulse train 91. The pull down command occurs when both 85 and 91 are present and is shown as pulse train 93.

Pulse 95 occurs during blanking setting the flip flop as indicated at point 96 on train 91. However, no pull down command output will occur until a pulse appears on train 85 coincident with a flip flop pulse on 91. When pulse 97 comes on, an output pulse 99 comes on 93. After a period determined by one-shot 37 of FIG. 2 the flip flop pulse 96 will be brought back to zero and so too pulse 99.

When pulse 101 on pulse train 87 begins, a pulse 103 on 85 is already present. Thus, a pull down command 105 will occur immediately. In a similar manner a command 107 will result from pulse 109. Pulse 107 will be shorter than 99 and 105 since the pulse 111 on 85 goes to zero before the flip flop pulse 112 on 91. Pulse 113 occurs after the pulse 115 on 85 has gone back to zero. the duration of these pulses (97, 103, 111, 115) is set so that the pulse will go to zero allowing sufficient time for a pull down before the light shown by pulse train 83 comes on. Thus a pull down command 117 will not occur until after the next light flash when another pulse 119 appears on 85. In this way, by timing the occurance and length of the pulses 97, 103, 111, etc., so that a pull down will never occur when the light is on, satisfactory operation at all speeds up to the frame rate of the television camera is possible.

Thus, a system which provides means of synchronizing a projector lamp and pull down with a television vertical scan to provide a good picture free of bars and flicker has been shown. Frequency of "on" time pulses of the projection lamp is constant and synchronized with the vertical scan rate of the TV camera; frequency of frame advance or pull down is variable as desired but due to the novel circuitry of the invention, a pull down cannot occur when the lamp is "on." Although a specific application to a variable frame rate projection system for providing a visual display in a vehicle simulator environment has been shown, the system will work equally well in a constant speed, broadcasting type system.

What is claimed is:

1. In a telecine system comprising a film projector having a pulsed pull down and a television camera viewing the image projected by the projector, means to provide for synchronizing the frame projection rate of said projector with the scan of said television camera comprising:

a. means to generate command signals of a variable rate from zero cycles per second to the television field rate, each signal indicating that the film in the projector is to be pulled down to index the next frame for projection;

b. means having as an input the vertical sync command of said television camera to synchronize the vertical scan of the television camera and the projection of an image by the projector to the camera pickup tube so that the beginning and end of said projection occurs during substantially the same portion of each vertical scan;

c. means to generate a pulse beginning a first predetermined time after the end of said projection and ending a second predetermined time before the beginning of the next projection; and d. means responsive to said command signals and said pulse to actuate the projector pulldown when one of each of said signals and said pulses is present at the same time.

2. The invention according to claim 1 wherein said synchronizing means comprise:

a. a rotatable shutter having at least one open portion said shutter being interposed between the projector lamp and the film gate in said projector;

b. means to rotate said shutter;

c. means coupled to said rotating means to provide a pulse output during at least a portion of the time when the open portion of said shutter is between said lamp and said gate;

d. a phase detector having as inputs said pulse output and the vertical sync command of said television camera and providing an output indicative of the phase difference between the pulses of said pulse output and said sync command;

e. control means responsive to said phase detector output to control the speed of said rotating means to maintain a predetermined phase difference between said pulse output and said sync command thereby causing the projection of an image to be synchronized with the television vertical scan.

3. The invention according to claim 2 wherein said means to rotate comprises an electric motor and said phase detector comprises at least a flip flop having its set input coupled to said pulse output and its reset input coupled to said sync command and said predetermined phase difference is such that said flip flop will be on and off for equal time periods and said control means comprise:

a. a network having said phase detector output as a first input and an offset voltage as a second input said network providing averaging of said phase detector output and summing of said averaged output with said off-set voltage, said offset voltage being selected to provide a sum of zero for the average resulting when said flip flop is on and off for equal times; and b. rate servo means comprising said motor, amplification means and a tachometer coupled to said motor, said amplification means providing its output to drive said motor and having as inputs, at a summing junction, the output of said tachometer, a voltage proportional to a nominal shutter rotation speed and the output of said network whereby said network output will provide a correction to said servo means when said shutter is not synchronized with said vertical scan.

4. The invention according to claim 3 and further including means to provide a visual indication of loss of synchronism.

5. The invention according to claim 1 wherein said second predetermined time is at least equal to the time required to accomplish a complete pull down.

6. The invention according to claim 5 wherein said vertical scan and projection of an image are so synchronized that one projection take place for each field of the vertical scan.

7. The invention according to claim 6 wherein the beginning and end of said projection is controlled by a shutter device interposed between a projection lamp and film image.

8. The invention according to claim 7 wherein said beginning and end of projection are timed to occur substantially within the vertical retrace time of the TV camera.

9. The invention according to claim 7 wherein the video signal from the TV camera provides the input for a visual display device arranged for viewing by a student in a vehicle simulator.

10. The invention according to claim 9 wherein said variable rate is commensurate with outputs determined by control settings on said simulator.

11. The invention according to claim 7 wherein said command signal generating means comprise means to generate pulses at said variable rate, a flip flop having said pulses as a set input and providing said command signals at its output and means to provide a reset pulse to said flip flop after each pull down pulse.

12. The invention according to claim 11 wherein said pulses at said variable rate are provided by a voltage controlled oscillator having an analog voltage input proportional to said variable rate.

13. The invention according to claim 11 wherein said means to generate said pulse comprises a one shot multivibrator timing circuit having the vertical sync command of said television camera as an input and adapted to provide an output the beginning of which is slightly delayed from the end of projection, and of a length which is less than the time between projections and said responsive means comprise an And gate having the outputs of said timing circuit and said command signals as inputs and providing its output as a projector pull down command.

14. The invention according to claim 13 wherein said means to provide said reset pulse comprise one shot multivibrator timing means having an input from said And gate and providing said reset pulse as an output of a predetermined time after obtaining an input.

* * * * *